United States Patent
Duranleau-Hendrickx

(10) Patent No.: US 12,535,016 B2
(45) Date of Patent: Jan. 27, 2026

(54) SYSTEMS AND METHODS FOR IDENTIFYING INSUFFICIENT STARTER ACCELERATION FOR AN AIRCRAFT ENGINE

(71) Applicant: Pratt & Whitney Canada Corp., Longueuil (CA)

(72) Inventor: Louis Duranleau-Hendrickx, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 334 days.

(21) Appl. No.: 18/233,133

(22) Filed: Aug. 11, 2023

(65) Prior Publication Data

US 2025/0052171 A1 Feb. 13, 2025

(51) Int. Cl.
*F01D 21/00* (2006.01)
*F01D 19/00* (2006.01)
*F01K 13/02* (2006.01)
*F02C 7/26* (2006.01)
*B64D 13/06* (2006.01)

(52) U.S. Cl.
CPC ........... *F01D 21/003* (2013.01); *F01D 19/00* (2013.01); *F01K 13/02* (2013.01); *F02C 7/26* (2013.01); *B64D 2013/0696* (2013.01); *F05D 2260/83* (2013.01); *F05D 2260/85* (2013.01)

(58) Field of Classification Search
CPC ........ F01D 21/003; F01D 19/00; F01D 19/02; F01K 13/02; F02C 7/26; B64D 2013/0696; F05D 2260/83; F05D 2260/85; F02N 11/108
See application file for complete search history.

(56) References Cited

U.S. PATENT DOCUMENTS 5,428,275 A * 6/1995 Carr ..................... F02N 11/04
318/715
5,430,362 A * 7/1995 Carr ..................... H02P 9/302
318/779

(Continued)

OTHER PUBLICATIONS

EP Search Report for EP Patent Application No. 24194081.6 dated Jan. 14, 2025.

*Primary Examiner* — Syed O Hasan
(74) *Attorney, Agent, or Firm* — Getz Balich LLC

(57) ABSTRACT

An assembly for an aircraft engine includes a rotational assembly, a starter, and a controller. The rotational assembly includes at least one rotor. The starter is coupled with the rotational assembly. The starter is configured to selectively drive rotation of the rotational assembly. The controller is configured to determine an acceleration threshold for a starter-assist only phase of an engine start sequence for the aircraft engine using a measured engine oil temperature for the aircraft engine, measure an acceleration of the rotational assembly during the starter-assist only phase, and identify a presence or an absence of insufficient starter acceleration for the starter-assist only phase by comparing the measured acceleration to the acceleration threshold. The presence of the insufficient starter acceleration is identified when the measured acceleration is less than the acceleration threshold. The absence of the insufficient starter acceleration is identified when the measured acceleration is greater than the acceleration threshold.

16 Claims, 7 Drawing Sheets

(56) References Cited

U.S. PATENT DOCUMENTS

| | | | |
|---|---|---|---|
| 6,035,626 | A | 3/2000 | Wahl |
| 7,448,220 | B2 | 11/2008 | Schmidt |
| 10,352,189 | B2 | 7/2019 | Lamarre |
| 2007/0084214 | A1 | 4/2007 | Schmidt |
| 2010/0303611 | A1* | 12/2010 | Kim ...................... G01M 15/14 |
| | | | 415/118 |
| 2018/0328220 | A1 | 11/2018 | Lamarre |
| 2020/0003072 | A1* | 1/2020 | Zawilinski .............. F02C 7/277 |
| 2023/0030319 | A1* | 2/2023 | Szillat ..................... F02C 7/275 |

* cited by examiner

SYSTEMS AND METHODS FOR IDENTIFYING INSUFFICIENT STARTER ACCELERATION FOR AN AIRCRAFT ENGINE

TECHNICAL FIELD

This disclosure relates generally to a starter for an aircraft engine and, more particularly, to systems and methods for identifying an existence and cause of an insufficient starter acceleration for an engine start sequence of the aircraft engine.

BACKGROUND OF THE ART

Aircraft engines may include electrical or pneumatic starters configured to facilitate engine start sequences by initiating engine rotation prior to combustion light-off. Occasionally, the starter for an aircraft engine may exhibit reduced acceleration during an engine start sequence, thereby complicating the engine start sequence or preventing completion of the start sequence. However, in some cases, the insufficient starter acceleration may not be identified until the insufficient acceleration has become significant or the engine has failed to start. Accordingly, there is room for improvement for identifying the existence and cause of insufficient starter acceleration for an engine start sequence of a aircraft engine.

SUMMARY

It should be understood that any or all of the features or embodiments described herein can be used or combined in any combination with each and every other feature or embodiment described herein unless expressly noted otherwise.

According to an aspect of the present disclosure, an assembly for an aircraft engine includes a rotational assembly, a starter, and a controller. The rotational assembly includes at least one rotor. The starter is coupled with the rotational assembly. The starter is configured to selectively drive rotation of the rotational assembly. The controller includes a processor in communication with a non-transitory memory storing instructions, which instructions when executed by the processor, cause the processor to determine an acceleration threshold for a starter-assist only phase of an engine start sequence for the aircraft engine using a measured engine oil temperature for the aircraft engine, measure an acceleration of the rotational assembly during the starter-assist only phase, and identify a presence or an absence of insufficient starter acceleration for the starter-assist only phase by comparing the measured acceleration to the acceleration threshold. The presence of the insufficient starter acceleration is identified when the measured acceleration is less than the acceleration threshold. The absence of the insufficient starter acceleration is identified when the measured acceleration is greater than the acceleration threshold.

In any of the aspects or embodiments described above and herein, the instructions, when executed by the processor, may further cause the processor to identify the measured engine oil temperature at an initiation of the engine start sequence.

In any of the aspects or embodiments described above and herein, the instructions, when executed by the processor, may further cause the processor to measure the acceleration of the rotational assembly at a predetermined rotation speed of the rotational assembly during the starter-assist only phase.

In any of the aspects or embodiments described above and herein, the measured acceleration may be an area under an acceleration curve for the starter-assist only phase. The acceleration curve may represent a starter-assist only acceleration of the rotational assembly and a starter-assist only rotation speed of the rotational assembly between a low-speed boundary and a high-speed boundary within the starter-assist only phase.

In any of the aspects or embodiments described above and herein, the instructions, when executed by the processor, may further cause the processor to generate a warning in response to identifying the presence of the insufficient starter acceleration.

In any of the aspects or embodiments described above and herein, the engine start sequence may be a restart sequence for the aircraft engine during a flight condition.

In any of the aspects or embodiments described above and herein, the instructions, when executed by the processor, may further cause the processor to determine the acceleration threshold for the starter-assist only phase using the measured engine oil temperature and an airspeed for the aircraft engine.

In any of the aspects or embodiments described above and herein, the instructions, when executed by the processor, may further cause the processor to identify a cause of the insufficient starter acceleration during a shutdown sequence for the aircraft engine. The shutdown sequence may be subsequent to the engine start sequence.

In any of the aspects or embodiments described above and herein, the instructions, when executed by the processor, may further cause the processor to identify the cause of the insufficient starter acceleration by comparing a rundown time for the rotational assembly during the shutdown sequence to a rundown time threshold.

In any of the aspects or embodiments described above and herein, the instructions, when executed by the processor, may further cause the processor to determine the rundown time threshold using an air inlet temperature, an altitude, and the measured engine oil temperature.

In any of the aspects or embodiments described above and herein, the instructions, when executed by the processor, may further cause the processor to identify the cause of the insufficient starter acceleration as rotational assembly drag when the rundown time is less than the rundown time threshold or as the starter when the rundown time is greater than the rundown time threshold.

In any of the aspects or embodiments described above and herein, the starter may be an electric starter.

In any of the aspects or embodiments described above and herein, the starter may be a pneumatic starter.

According to another aspect of the present disclosure, a method for identifying insufficient starter acceleration for an engine start sequence for an aircraft engine includes initiating the engine start sequence for the aircraft engine. The engine start sequence includes applying a rotational force to a rotational assembly of the aircraft engine with a starter. The method further includes measuring an engine oil temperature for the aircraft engine, determining an acceleration threshold for a starter-assist only phase of the engine start sequence using the measured engine oil temperature, measuring an acceleration of the rotational assembly during the starter-assist only phase, and identifying a presence or an absence of insufficient starter acceleration for the starter-assist only phase by comparing the measured acceleration to the acceleration threshold. The presence of the insufficient starter acceleration is identified when the measured acceleration is less than the acceleration threshold. The absence of the insufficient starter acceleration is identified when the measured acceleration is greater than the acceleration threshold.

In any of the aspects or embodiments described above and herein, measuring the acceleration may include measuring the acceleration at a predetermined rotation speed of the rotational assembly during the starter-assist only phase.

In any of the aspects or embodiments described above and herein, the measured acceleration may be an area under an acceleration curve for the starter-assist only phase. The acceleration curve may represent a starter-assist only acceleration of the rotational assembly and a starter-assist only rotation speed of the rotational assembly between a low-speed boundary and a high-speed boundary within the starter-assist only phase.

In any of the aspects or embodiments described above and herein, the method may further include identifying a cause of the insufficient starter acceleration during a shutdown sequence for the aircraft engine. The shutdown sequence may be subsequent to the engine start sequence.

According to another aspect of the present disclosure, an assembly for an aircraft engine includes a rotational assembly, a starter, and a controller. The rotational assembly includes at least one rotor. The starter is configured to selectively drive rotation of the rotational assembly. The controller includes a processor in communication with a non-transitory memory storing instructions, which instructions when executed by the processor, cause the processor to determine an acceleration threshold for a starter-assist only phase of an engine start sequence for the aircraft engine, measure an acceleration of the rotational assembly during the starter-assist only phase, identify a presence of insufficient starter acceleration for the starter-assist only phase by comparing the measured acceleration to the acceleration threshold, and identify a cause of the insufficient starter acceleration, in response to identification of the presence of the insufficient starter acceleration, during a shutdown sequence for the aircraft engine, by comparing a rundown time for the rotational assembly during the shutdown sequence to a rundown time threshold.

In any of the aspects or embodiments described above and herein, the measured acceleration may be an area under an acceleration curve for the starter-assist only phase. The acceleration curve may represent a starter-assist only acceleration of the rotational assembly and a starter-assist only rotation speed of the rotational assembly between a low-speed boundary and a high-speed boundary within the starter-assist only phase.

In any of the aspects or embodiments described above and herein, the instructions, when executed by the processor, may further cause the processor to determine the rundown time threshold using an air inlet temperature, an altitude, and the measured engine oil temperature and identify the cause of the insufficient starter acceleration as rotational assembly drag when the rundown time is less than the rundown time threshold or as the starter when the rundown time is greater than the rundown time threshold.

The present disclosure, and all its aspects, embodiments and advantages associated therewith will become more readily apparent in view of the detailed description provided below, including the accompanying drawings.

DETAILED DESCRIPTION

Figure 1:
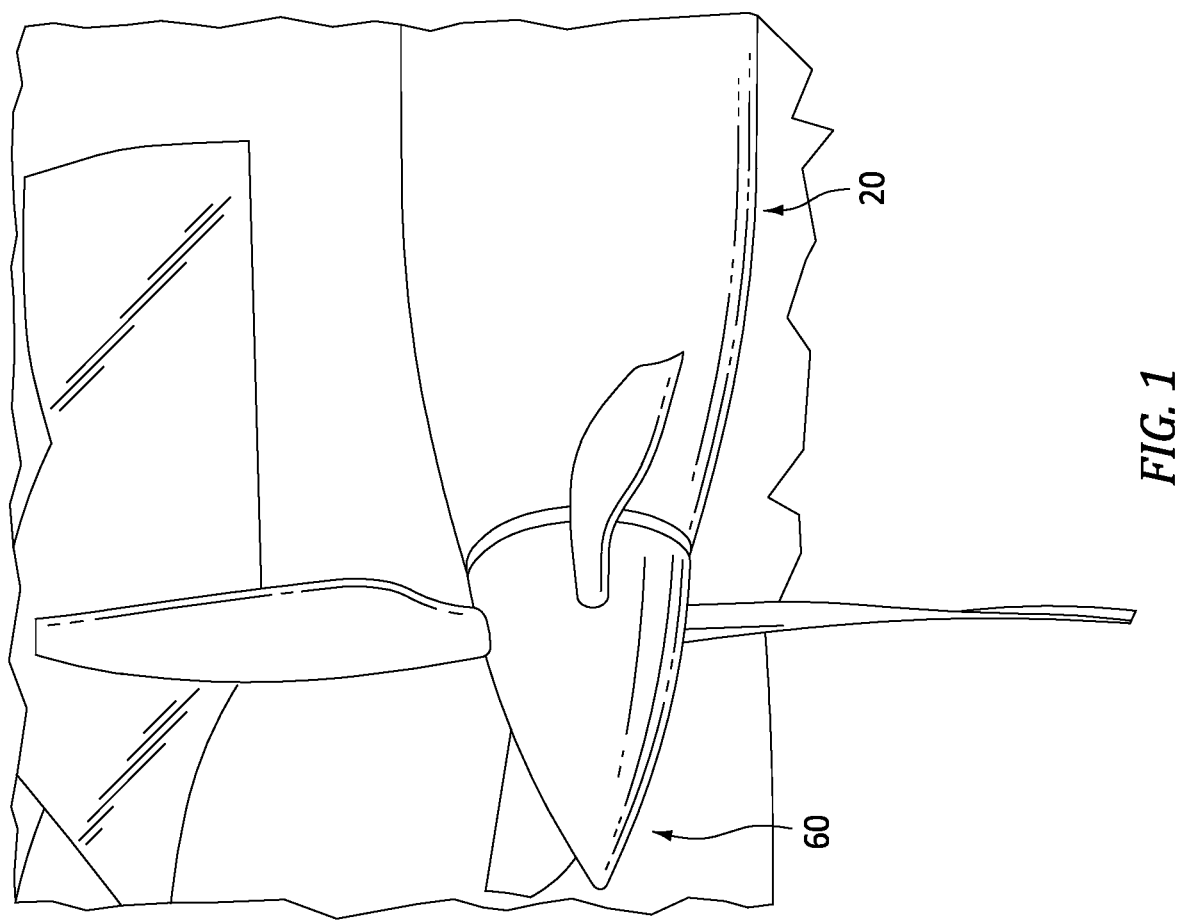
FIG. 1 illustrates a perspective view of a propulsion system for an aircraft, in accordance with one or more embodiments of the present disclosure.
Figure 2:
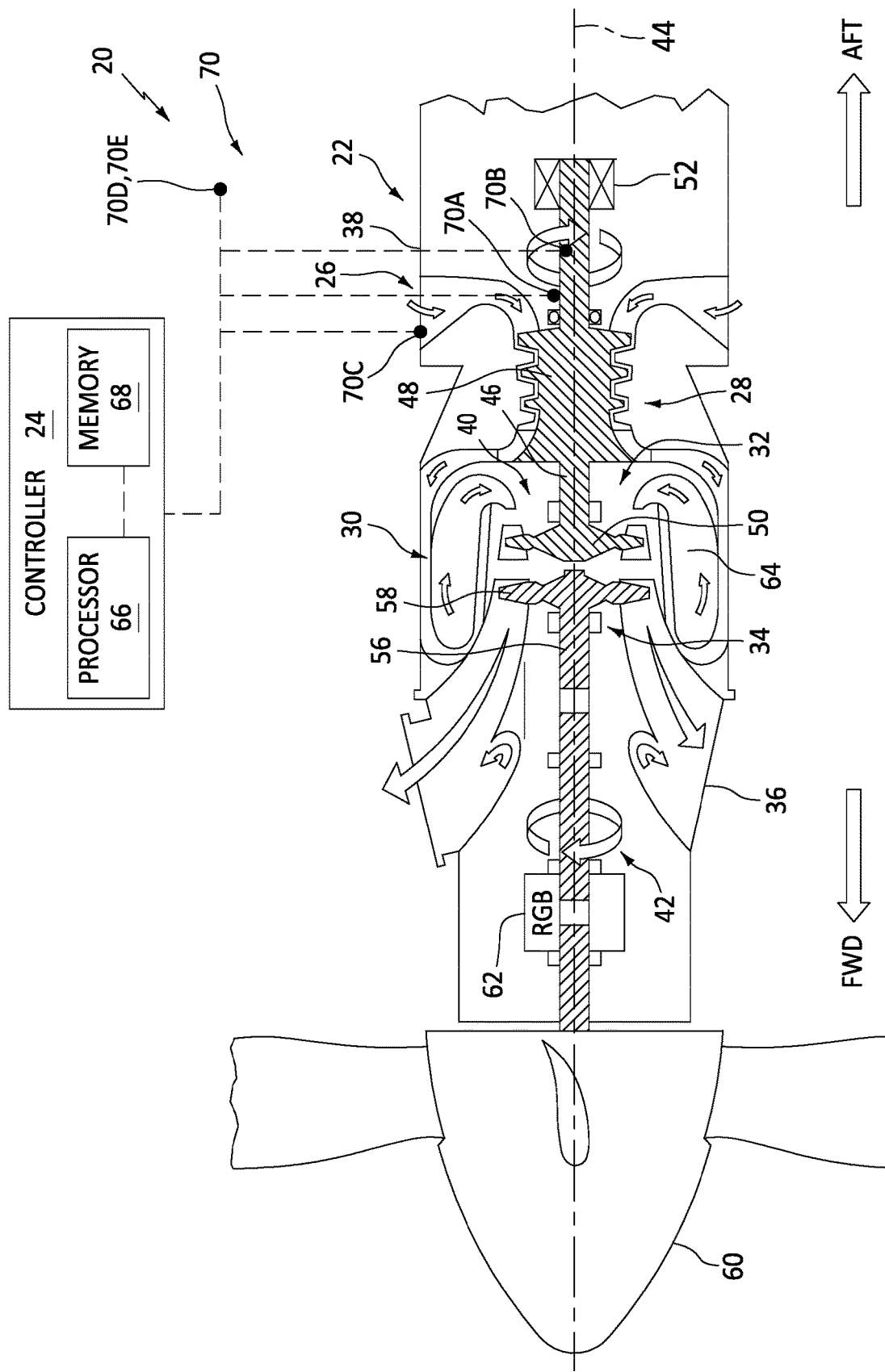
FIG. 2 illustrates side, cutaway view of an engine for an aircraft propulsion system, in accordance with one or more embodiments of the present disclosure.

FIGS. 1 and 2 illustrate a propulsion system 20 for an aircraft. Briefly, the aircraft may be a fixed-wing aircraft (e.g., an airplane), a rotary-wing aircraft (e.g., a helicopter), a tilt-rotor aircraft, a tilt-wing aircraft, or any other aerial vehicle. Moreover, the aircraft may be a manned aerial vehicle or an unmanned aerial vehicle (UAV, e.g., a drone). The aircraft propulsion system 20 of FIG. 2 includes an engine 22 and a controller 24.

FIG. 2 illustrates a side, cutaway view of the propulsion system 20 illustrating the engine 22. The engine 22 of FIG. 2 is configured as a multi-spool turboprop gas turbine engine. However, the present disclosure is also applicable to other configurations of gas turbine engines such as, but not limited to, a turbofan gas turbine engine, a turboshaft gas turbine engine, and a turbojet gas turbine engine. Moreover, the present disclosure is also applicable to other configurations of engines such as, but not limited to, a rotary engine, a piston engine, an auxiliary power unit (APU), or the like, which may be used for aircraft or aircraft propulsion systems.

The engine 22 of FIG. 2 includes an air inlet 26, a compressor 28, a combustor 30, a high-pressure turbine 32, a power turbine 34, an exhaust 36, and an engine static structure 38. The engine static structure 38 may include, for example, one or more engine cases for the engine 22. The engine static structure 38 may additionally include cowlings, bearing assemblies, and/or other structural components of the engine 22. The one or more engine cases form, house, and/or structurally support one or more of the air inlet 26, the compressor 28, the combustor 30, the high-pressure turbine 32, the power turbine 34, and the exhaust 36.

Components of the engine 22, such as components of the compressor 28, the high-pressure turbine 32, and the power turbine 34, are arranged as a first rotational assembly 40 (e.g., a high-pressure spool) and a second rotational assembly 42 (e.g., a power spool). The first rotational assembly 40 and the second rotational assembly 42 are mounted for rotation about a rotational axis 44 (e.g., an axial centerline of the engine 22) relative to the engine static structure 38. The engine 22 of FIG. 2 has a "free turbine" configuration. The present disclosure, however, is not limited to free turbine gas turbine engine configurations.

The first rotational assembly 40 includes a first shaft 46, a bladed compressor rotor 48 for the compressor 28, and a bladed first turbine rotor 50 for the high-pressure turbine 32. The first shaft 46 interconnects the bladed compressor rotor 48 and the bladed first turbine rotor 50.

The first rotational assembly 40 of FIG. 2 further includes a starter 52. The starter 52 of FIG. 2 is coupled with the first rotational assembly 40 (e.g., the first shaft 46). The starter 52 is configured to selectively drive rotation of the first rotational assembly 40 to facilitate an engine start sequence for the engine 22 by directly or indirectly applying a rotational force to the first rotational assembly 40. The starter 52 of FIG. 2 is directly coupled to the first shaft 46. Alternatively, the starter 52 may be indirectly coupled with the first rotational assembly 40 (e.g., the first shaft 46) by a gearbox assembly such as, but not limited to, an accessory gearbox for the engine 22. The starter 52 of FIG. 2 may be configured as an electric starter. For example, the starter 52 may be configured as a starter-generator including an electric motor coupled with the first rotational assembly 40. The electric motor may be electrically connected with an electrical power source (e.g., a generator, an auxiliary power unit (APU), a battery, etc.; not shown) of the propulsion system 20 and/or the aircraft on which the propulsion system 20 is installed. The starter 52 may alternatively be configured as a pneumatic starter (e.g., a pneumatic-turbine starter) or another starter configured to facilitate an engine start sequence for an engine, such as the engine 22. Moreover, the present disclosure is not limited to starter 52 applications for the first rotational assembly 40 (e.g., a high-pressure spool).

The second rotational assembly 42 includes a second shaft 56, a bladed second turbine rotor 58 for the power turbine 34, and a propulsor 60. The second shaft 56 is connected to the bladed second turbine rotor 58. The second shaft 56 may be directly or indirectly connected to the propulsor 60 (e.g., an input shaft of the propulsor 60). For example, the second shaft 56 may be configured to rotatably drive the propulsor 60, using a reduction gear box (RGB) 62, at a reduced rotational speed relative to the second shaft 56. Alternatively, the second shaft 56 may directly interconnect the bladed second turbine rotor 58 and the propulsor 60. The propulsor 60 of FIGS. 1 and 2 is a propeller configured for providing propulsion (e.g., thrust) for the propulsion system 20. However, the present disclosure is not limited to the foregoing exemplary propulsor 60 configuration.

The controller 24 includes a processor 66 connected in signal communication with memory 68. The processor 66 may include any type of computing device, computational circuit, processor(s), CPU, computer, or the like capable of executing a series of instructions that are stored in the memory 68. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the engine 22 and its components to accomplish the same algorithmically and/or by coordination of the engine 22 components. The memory 68 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 24. The controller 24 may include, or may be in communication with, an input device that enables a user to enter data and/or instructions, and may include, or be in communication with, an output device configured, for example to display information (e.g., a visual display or a printer), or to transfer data, etc. Communications between the controller 24 and other electrical and/or electronic components (e.g., controllers, sensors, etc.) may be via a hardwire connection or via a wireless connection. A person of skill in the art will recognize that portions of the controller 24 may assume various forms (e.g., digital signal processor, analog device, etc.) capable of performing the functions described herein.

The controller 24 may form or otherwise be part of an electronic engine controller (EEC) for the engine 22. The EEC may control operating parameters of the engine 22 including, but not limited to, fuel flow, stator vane position (e.g., variable compressor inlet guide vane (IGV) position), compressor air bleed valve position, shaft (e.g., first shaft 46 and/or second shaft 56) torque and/or rotation speed, etc. so as to control an engine power or performance of the engine 22. The EEC may modulate fuel flow to the combustor 30 to obtain a desired output power of the engine 22. For example, the EEC may modulate the fuel flow using a closed-loop process in which an output power or other operating parameter of the engine 22 is measured and fuel flow is increased or decreased as a function of the measured output power or operational parameter. In some embodiments, the EEC may be part of a full authority digital engine control (FADEC) system for the propulsion system 20.

The controller 24 may include or otherwise be connected in signal communication with one or more sensors 70 of the engine 22 to measure operational parameters of the engine 22. For example, the sensors 70 of FIG. 2 include an engine oil temperature sensor 70A, a rotation speed sensor 70B (e.g., for the first rotational assembly 40), an air inlet temperature sensor 70C, an altitude sensor 70D, and an airspeed sensor 70E. However, the present disclosure is not limited to the foregoing exemplary sensors 70.

During operation of the engine 22 of FIG. 2, ambient air enters the engine 22 through the air inlet 26 and is directed into the compressor 28. The ambient air is compressed by the bladed compressor rotor 48 and directed into a combustion chamber 64 of the combustor 30. Fuel is injected into the combustion chamber 64 and mixed with the compressed air to provide a fuel-air mixture. This fuel-air mixture is ignited, and combustion products thereof flow through and sequentially cause the bladed first turbine rotor 50 and the bladed second turbine rotor 58 to rotate. The rotation of the bladed first turbine rotor 50 and the bladed second turbine rotor 58 respectively drive rotation of the first rotational assembly 40 and the second rotational assembly 42. Rotation of the second rotational assembly 42 further drives rotation of the propulsor 60 to provide propulsion (e.g., thrust) for the propulsion system 20 and the aircraft on which the propulsion system 20 is installed. Combustion exhaust gas flowing past the bladed second turbine rotor 58 along is directed out of the engine 22 through the exhaust 36.

During an engine start sequence for the engine 22, the starter 52 initially drives rotation of the first rotational assembly 40 during a starter-assist only phase (e.g., prior to combustion light-off). During the starter-assist only phase, the starter 52 applies a rotational force to the first rotational assembly 40 to accelerate the first rotational assembly 40 to induce air flow through the engine 22 and, therefore, allow fuel to be directed into the combustor 30 for combustion. During this starter-assist only phase, only the starter 52 torque accelerates rotation of the first rotational assembly 40. The combustion light-off may be characterized, for example, by an initial injection of fuel into the combustor 30 (e.g., a "fuel on" step), a brief delay (e.g., up to a few seconds), and then ignition of the fuel in the combustor 30 (e.g., combustion light-off). Subsequent to combustion light-off, the engine start sequence for the engine 22 proceeds through phases of acceleration effected by both starter 52 torque and combustion torque and then, eventually, only combustion torque. If the starter 52 torque applied to the first rotational assembly 40 is too low or the first rotational assembly 40 drag is too high, the starting capability of the engine 22 may be adversely affected. For example, the engine 22 may experience higher interstage turbine temperatures (ITT) or exhaust gas temperatures (EGT), longer start times, and even failed starts.

Figure 3:
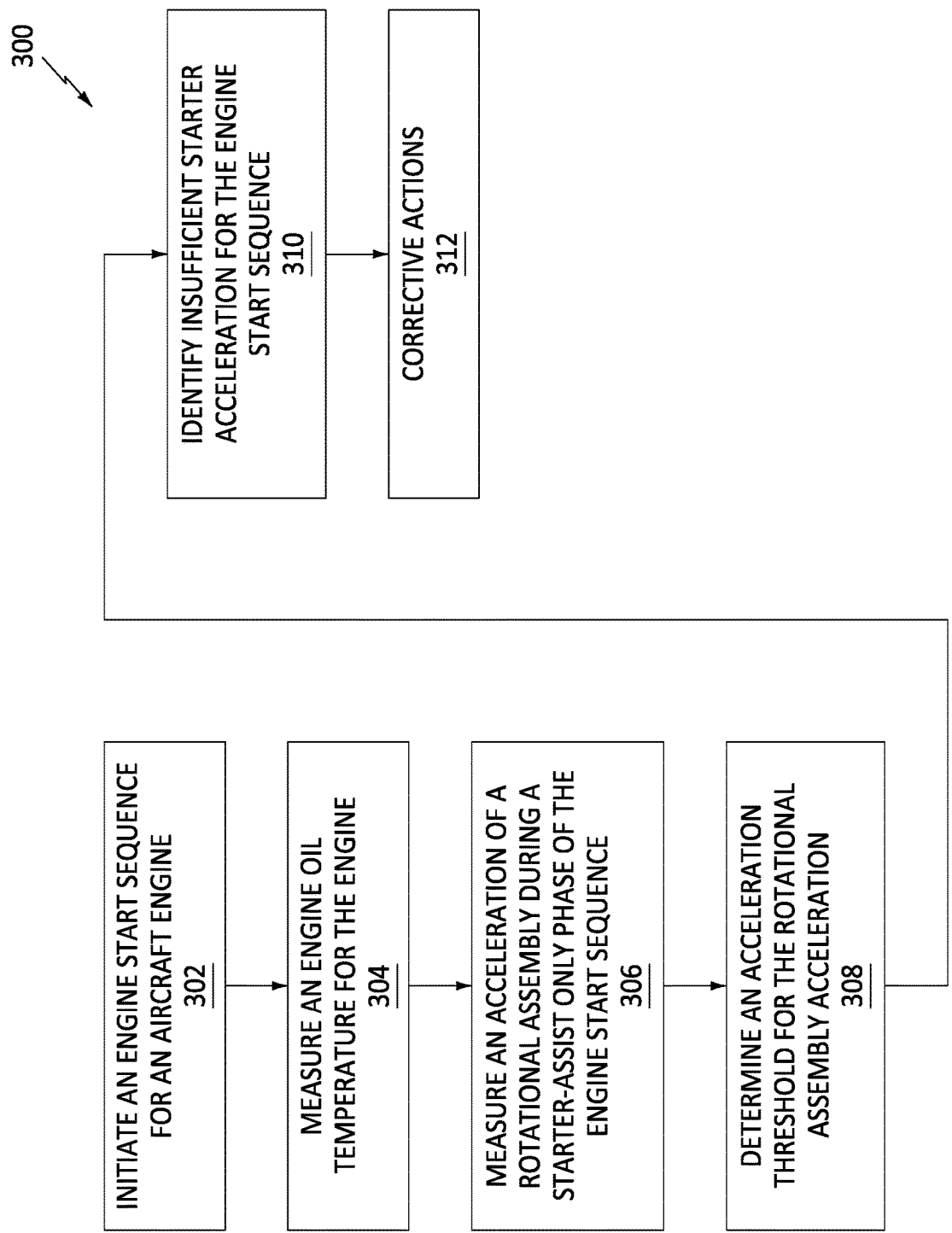
FIG. 3 illustrates a block diagram depicting a method for identifying insufficient starter acceleration during an aircraft engine start sequence, in accordance with one or more embodiments of the present disclosure.

Referring to FIGS. 2 and 3, a Method 300 for identifying insufficient starter acceleration during an aircraft engine start sequence is provided. FIG. 3 illustrates a flowchart for the Method 300. The Method 300 will be described herein with respect to the engine 22 and the controller 24. For example, the processor 66 may execute instructions stored in memory 68, thereby causing the controller 24 and/or its processor 66 to execute or otherwise control one or more steps of the Method 300. However, it should be understood that the Method 300 is not limited to use with the engine 22 or the controller 24. Unless otherwise noted herein, it should be understood that the steps of Method 300 are not required to be performed in the specific sequence in which they are discussed below and, in some embodiments, the steps of Method 300 may be performed separately or simultaneously.

Step 302 includes initiating an engine start sequence for the engine 22 using the starter 52. The engine start sequence may be initiated, for example, by a pilot or other operator of the propulsion system 20 and/or the aircraft on which the propulsion system 20 is installed. For example, a pilot may issue an electronic command to the controller 24 or to another control system of the propulsion system 20 to initiate the engine start sequence for the engine 22 using the starter 52.

Step 304 includes, optionally, measuring an engine oil temperature of the engine 22. For example, controller 24 may receive or otherwise determine a measured engine oil temperature (e.g., an electronic signal representative of engine oil temperature) from the engine oil temperature sensor 70A. The measured engine oil temperature may be the main oil temperature (MOT) for the engine 22 (e.g., for lubrication and cooling of components of the first rotational assembly 40 and/or the second rotational assembly 42). The measured oil temperature (e.g., the MOT) may be measured, for example, at (e.g., on, adjacent, or proximate) a main oil tank or main oil tank outlet. The measured engine oil temperature may be recorded (e.g., in memory 68). For example, the engine oil temperature of the engine 22 may be measured at recorded at (e.g., immediately or substantially immediately after) an initiation of the engine start sequence for the engine 22 (e.g., prior to application of rotational force to the first rotational assembly 40 by the starter 52). The engine oil temperature of the engine 22 may be a significant factor in drag experienced by the first rotational assembly 40 during an engine start sequence (e.g., the starter-assist only phase). However, operational parameters of the engine 22 other than the engine oil temperature of the engine 22 may additionally or alternatively be used to measure or estimate first rotational assembly 40 drag or rotational characteristics. For example, an air density of air flowing into the air inlet (see FIG. 2) may be measured or otherwise determined (e.g., using ambient air pressure and ambient air temperature).

Figure 4:
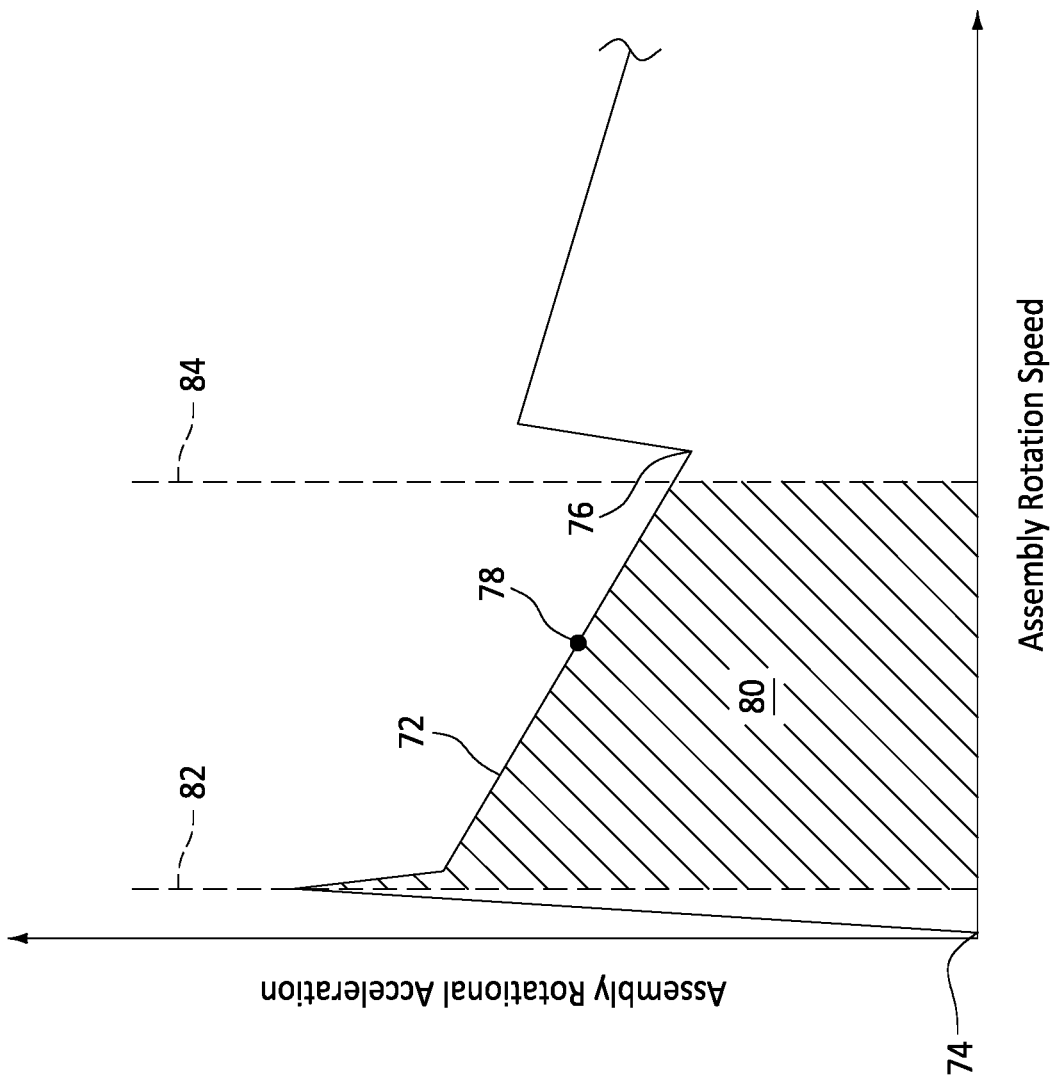
FIG. 4 a graph of acceleration vs. rotation speed for a portion of an engine start sequence, in accordance with one or more embodiments of the present disclosure.

Step 306 includes measuring an acceleration of the first rotational assembly 40 during the starter-assist only phase of the engine start sequence. FIG. 4 illustrates a graph of acceleration vs. rotation speed for a portion of the engine start sequence. The graph depicts an acceleration curve 72 representing an acceleration and a rotation speed of the first rotational assembly 40 for the portion of the engine start sequence. Initiation of the engine start sequence is identified in FIG. 4 at initiation point 74 of the acceleration curve 72. Combustion light-off is identified in FIG. 4 at light-off point 76 of the acceleration curve 72. The starter-assist only phase of the engine start sequence is defined between the initiation point 74 and the light-off point 76. During this starter-assist only phase, the rotation speed of the first rotational assembly 40 gradually increases until the rotation speed is sufficient for combustion light-off at the light-off point 76. Values of the rotation speed and acceleration of the first rotational assembly 40 may be measured or otherwise determined, for example, using the rotation speed sensor 70B (e.g., an electronic signal representative of rotation speed from the rotation speed sensor 70B).

Step 306 may include measuring the acceleration of the first rotational assembly 40 at one or more predetermined values of the rotation speed of the first rotational assembly 40 within the starter-assist only phase. For example, a value of the acceleration of the first rotational assembly 40 may be measured at a predetermined rotation speed value 78 within the starter-assist only phase. The predetermined value of the rotation speed of the first rotational assembly 40 may expressed as a revolutions-per-minute (RPM) value, a rotation speed as a percentage of rated speed, or another suitable representation of rotation speed.

Step 306 may alternatively include measuring the acceleration and the rotation speed of the first rotational assembly 40 during the starter-assist only phase and determining an area 80 under the acceleration curve 72 for the measured acceleration and rotation speed of the first rotational assembly 40. The area 80 may be determined for the acceleration curve 72 between a low-speed boundary 82 and a high-speed boundary 84. The low-speed boundary 82 is a predetermined value of rotation speed of the first rotational assembly 40 which is greater than zero (e.g., after initiation of the engine start sequence). The high-speed boundary 84 is a predetermined value of rotation speed of the first rotational assembly 40 which is expected to be reached by the first rotational assembly 40 prior to combustion light-off (e.g., the light-off point 76). The low-speed boundary 82 and the high-speed boundary 84 may be selected to maximize a rotation speed range between the low-speed boundary 82 and the high-speed boundary 84 while maintaining the low-speed boundary 82 and the high-speed boundary 84 within the starter-assist only phase. The low-speed boundary 82 and the high-speed boundary 84 of the present disclosure are not limited to any particular values. Routine experimentation and/or analysis may be performed by a person of ordinary skill in the art to determine suitable values of the low-speed boundary 82 and the high-speed boundary 84, in accordance with and as informed by one or more aspects of the present disclosure. The area 80 may be determined using any suitable numerical integration technique (e.g., the rectangular rule, trapezoidal rule, Simpson's rule, etc.) and the present disclosure is not limited to any particular technique or method for determining the area 80. Determining the area 80 may provide greater accuracy in identifying insufficient starter acceleration during an aircraft engine start sequence, for example, in comparison to measuring the acceleration of the first rotational assembly 40 at one or more predetermined values of the rotation speed of the first rotational assembly 40 within the starter-assist only phase.

Figure 5:
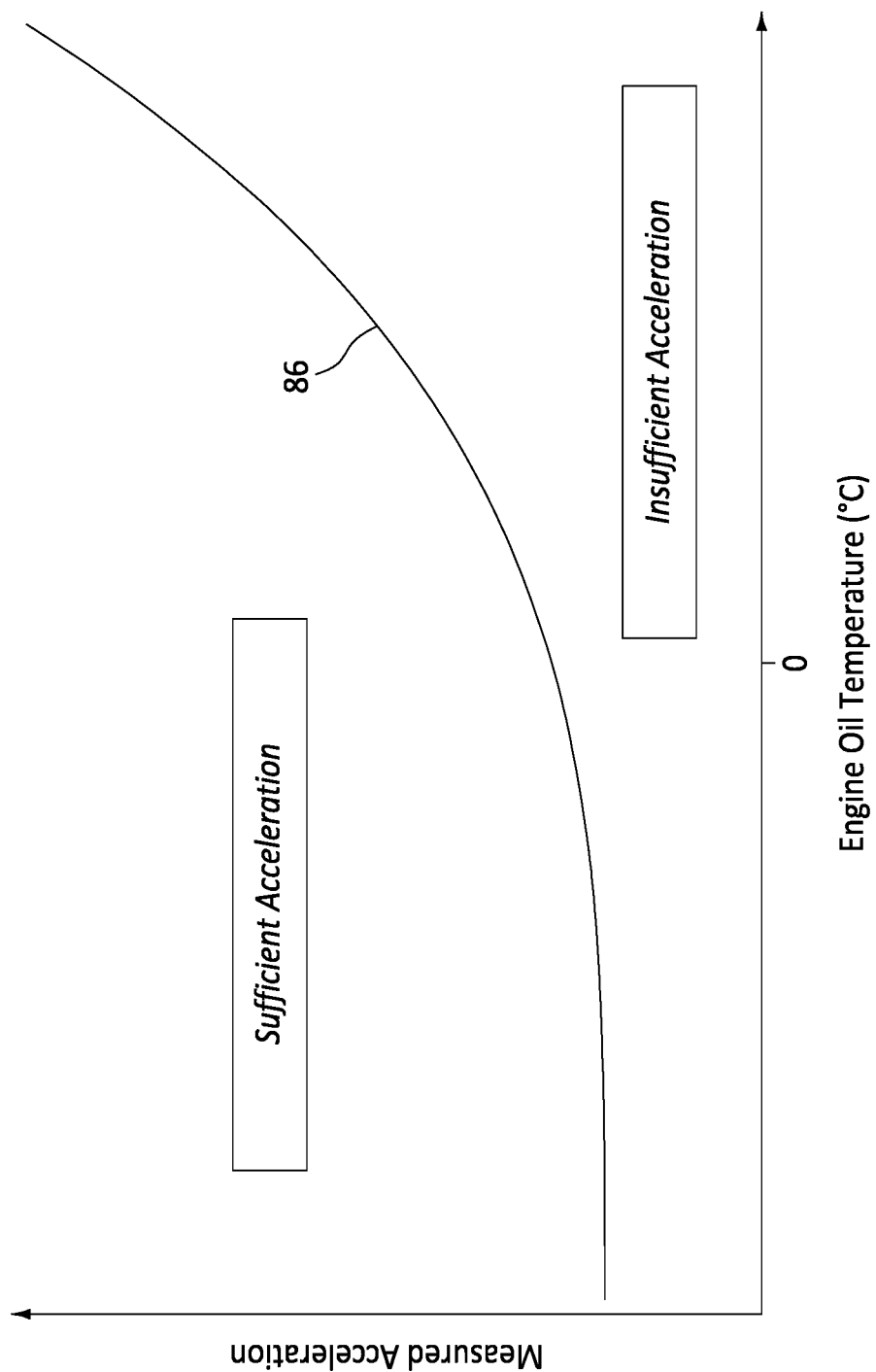
FIG. 5 illustrates a acceleration threshold curve using a graph of acceleration vs. engine oil temperature of an engine, in accordance with one or more embodiments of the present disclosure.

Step 308 includes determining an acceleration threshold for the measured acceleration (e.g., the measured area 80 or the measured acceleration at one or more of the predetermined rotation speed value 78) during the starter-assist only phase. The acceleration threshold is representative of a minimum acceptable acceleration value for the starter-assist only phase. The acceleration threshold may be, in part, a function of the engine oil temperature for the engine 22. For example, FIG. 5 illustrates an exemplary acceleration threshold curve 86 using a graph of first rotational assembly 40 acceleration vs. engine oil temperature of the engine 22. As shown in FIG. 5, values of the acceleration threshold may generally increase as the measured engine oil temperature increases. The measured engine oil temperature for the engine 22 (see Step 304) may be used to determine the acceleration threshold. For example, the acceleration threshold may be determined by the controller 24 using the measured engine oil temperature and a look-up table or another suitable algorithm for determining the acceleration threshold using the measured engine oil temperature. Routine experimentation and/or analysis may be performed by a person of ordinary skill in the art to determine suitable values of the acceleration threshold, in accordance with and as informed by one or more aspects of the present disclosure. For example, values of the acceleration threshold may vary based on factors such as, but not limited to, engine size, starter size, combustion air flow requirements, etc. As previously discussed, other operational parameters of the engine 22 affecting first rotational assembly 40 drag or rotational characteristics (e.g., air density) may additionally or alternatively be used to determine the acceleration threshold. Determining the acceleration threshold may additionally include offsetting the acceleration threshold by a margin to account for sensor uncertainties (e.g., oil temperature measurements, acceleration measurements, etc.), engine-to-engine variability, normal engine health deterioration, and the like.

Step 310 includes identifying a presence or an absence of insufficient starter acceleration for the first rotational assembly 40. The presence or the absence of insufficient starter acceleration is identified by comparing the measured acceleration for the starter-only assist phase (see Step 306) to the determined acceleration threshold (see Step 308). For example, the controller 24 may identify the absence of insufficient starter acceleration when the measured acceleration is greater than (or greater than or equal to) the determined acceleration threshold, as shown in FIG. 5. For further example, the controller 24 may identify the presence of insufficient starter acceleration when the measured acceleration is less than (or less than or equal to) the determined acceleration threshold, as also shown in FIG. 5.

Step 312 may include execution of one or more corrective actions in response to identifying the presence of insufficient starter acceleration for the first rotational assembly 40. For example, Step 312 may include generating a warning (e.g., an audible alarm, a warning light, a warning message, etc.) for a pilot or other operator of the aircraft on which the propulsion system 20 is installed. The warning may inform the pilot or other operator that starter acceleration for the first rotational assembly 40 was identified as insufficient and that inspection and/or maintenance (e.g., starter 52 replacement) should be performed for the engine 22, the first rotational assembly 40, and/or the starter 52.

The Steps of the Method 300 described above may be performed for an engine start sequence for the engine 22 while the aircraft on which the propulsion system 20 is mounted is in a grounded condition. Alternatively, the Steps of the Method 300 may additionally be performed to identify insufficient starter acceleration during an aircraft engine start sequence when the aircraft is in a flight condition (e.g., an "air restart" of the engine 22 while the aircraft is airborne). For an air restart engine start sequence for the engine 22, the Step 308 may include determining the acceleration threshold using an airspeed (e.g., an electronic signal representative of airspeed from the airspeed sensor 70E) of the aircraft in addition to the engine oil temperature. The measured airspeed may be used to account for the impact of ambient air flow into the air inlet 26 and through the engine 22 on the first rotational assembly 40 rotation speed during flight conditions of the aircraft.

Figure 6:
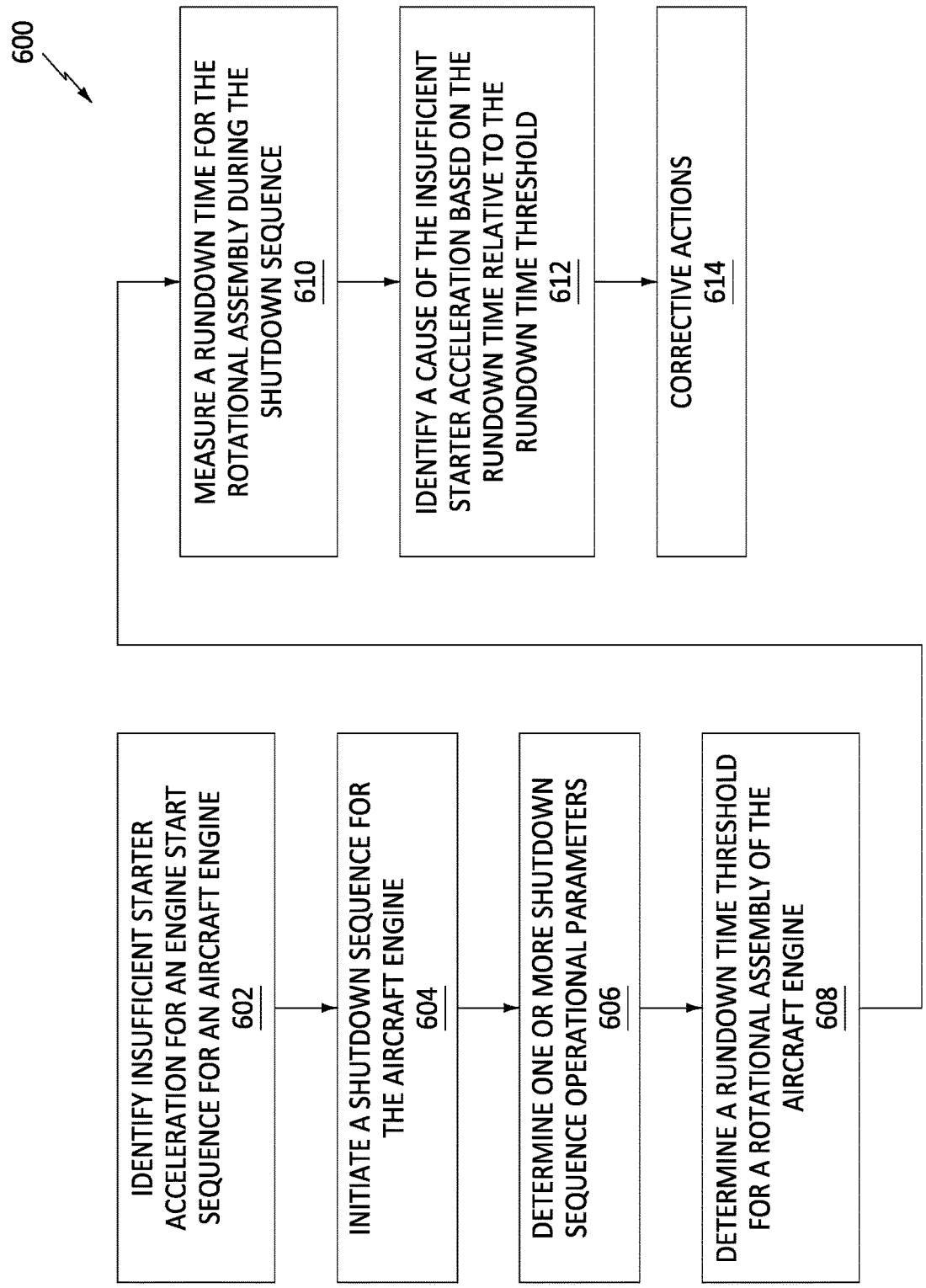
FIG. 6 illustrates a block diagram depicting a method for identifying a cause of insufficient starter acceleration, in accordance with one or more embodiments of the present disclosure.

Referring to FIGS. 2 and 6, a Method 600 for identifying a cause of insufficient starter acceleration is provided. FIG. 6 illustrates a flowchart for the Method 600. The Method 600 will be described herein with respect to the engine 22 and the controller 24. For example, the processor 66 may execute instructions stored in memory 68, thereby causing the controller 24 and/or its processor 66 to execute or otherwise control one or more steps of the Method 600. However, it should be understood that the Method 600 is not limited to use with the engine 22 or the controller 24. The Method 600 may be performed in combination with the Method 300 to identify insufficient starter acceleration and to identify a cause of the insufficient starter acceleration. The present disclosure, however, is not limited to performance of the Method 600 in combination with the Method 300. Unless otherwise noted herein, it should be understood that the steps of Method 600 are not required to be performed in the specific sequence in which they are discussed below and, in some embodiments, the steps of Method 600 may be performed separately or simultaneously.

Step 602 includes identifying insufficient starter acceleration during an aircraft engine start sequence. Identification of the insufficient starter acceleration may be performed, for example, using the Method 300. However, the present disclosure is not limited to any particular system, method, or technique for identifying insufficient starter acceleration (e.g., for the first rotational assembly 40 and its starter 52).

Step 604 includes initiating a shutdown sequence for the engine 22. The shutdown sequence for the engine 22 may generally be performed from an idle operating condition of the engine 22 with the aircraft on which the propulsion system 20 is installed in a grounded condition. The shutdown sequence described herein for the Method 600 may be a first shutdown of the engine 22 following the engine start sequence in which the insufficient starter acceleration was identified. For example, in response to the identification of insufficient starter acceleration, the controller 24 may initiate performance of one or more of the Steps of the Method 600 to identify a cause of the insufficient starter acceleration during the next (e.g., immediately following) shutdown sequence for the engine 22.

Step 606 includes determining one or more shutdown sequence operating parameters for the engine 22. The shutdown sequence operating parameters may include, but are not limited to, an air inlet temperature (e.g., an electronic signal representative of air inlet temperature from the air inlet temperature sensor 70C), an altitude for the engine 22 (e.g., an electronic signal representative of altitude from the altitude sensor 70D), and an engine oil temperature (e.g., an electronic signal representative of engine oil temperature from the engine oil temperature sensor 70A). The shutdown sequence operating conditions may include additional or alternative operating parameters which may have a substantial impact on a rundown time for the engine 22.

Figure 7B:
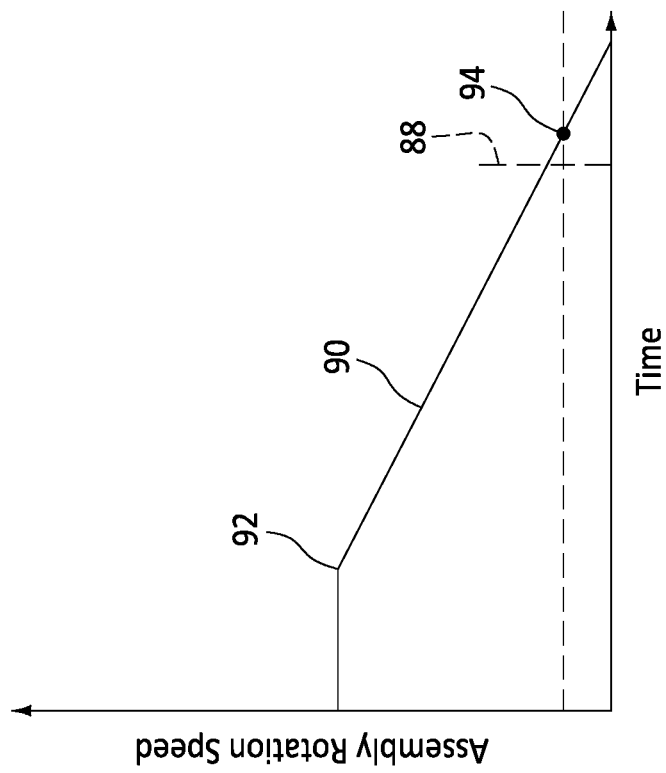
FIGS. 7A-B illustrate exemplary rundown rotation speed profiles for an engine during an engine shutdown sequence, in accordance with one or more embodiments of the present disclosure.
Figure 7A:
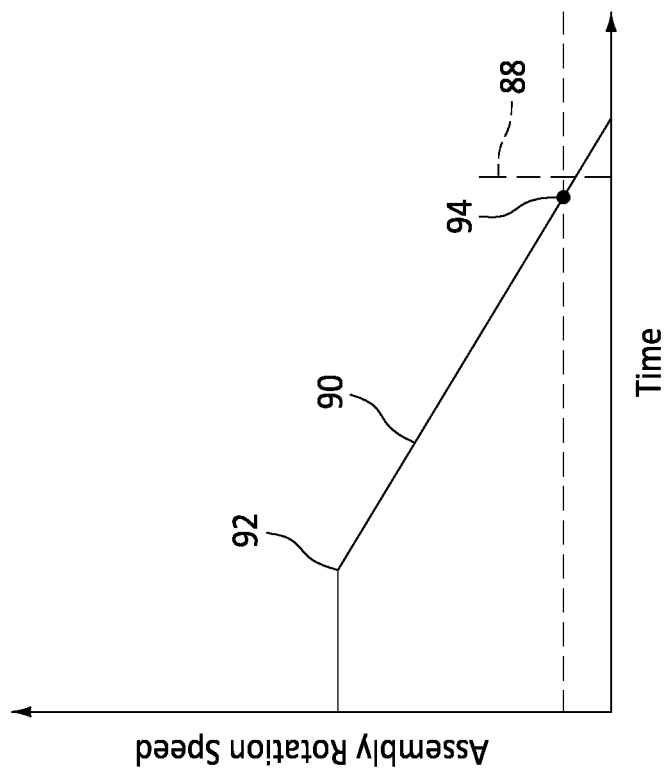

Step 608 includes determining a rundown time threshold for the first rotational assembly 40 during the shutdown sequence using the shutdown sequence operating parameters (e.g., air inlet temperature, altitude, and engine oil temperature). FIGS. 7A and 7B each illustrate a rundown time threshold 88 for a shutdown sequence. The rundown time threshold is an expected amount of time for the first rotational assembly 40 to slow from a first rotational speed at the initiation of the shutdown sequence (e.g., a ground idle speed) to a second predetermined rotation speed based on the shutdown sequence operating parameters. The second predetermined rotation speed may be a relatively slow rotation speed (e.g., less than or equal to 10% of rated rotation speed). Alternatively, the second predetermined rotation speed may be zero (e.g., the first rotational assembly 40 may be fully stopped). The rundown time threshold may be determined by the controller 24 using the shutdown sequence operating parameters and a look-up table or another suitable algorithm for determining the rundown time threshold using the shutdown sequence operating parameters. Routine experimentation and/or analysis may be performed by a person of ordinary skill in the art to determine an expected time or range of expected times for a rotational assembly (e.g., the first rotational assembly 40) to slow to a predetermined rotation speed for various shutdown sequence operating parameters, in accordance with and as informed by one or more aspects of the present disclosure. Determining the rundown time threshold may additionally include offsetting the rundown time threshold by a margin to account for sensor uncertainties (e.g., oil temperature measurements, acceleration measurements, etc.), engine-to-engine variability, normal engine health deterioration, and the like.

Step 610 includes measuring a rundown time for the first rotational assembly 40 during the shutdown sequence. FIGS. 7A and 7B each illustrate an exemplary rundown rotation speed profile 90 for the first rotational assembly 40 during the shutdown sequence. The rundown rotation speed profile 90 of FIGS. 7A and 7B begins at a shutdown sequence initiation 92 (e.g., a first rotation speed) and continues to a second predetermined rotation speed 94. For ease of understanding, the rotation speed of the rundown rotation speed profile 90 of FIGS. 7A and 7B is illustrated as decreasing generally linearly subsequent to the shutdown sequence initiation 92, however, it should be understood that the change in rotation speed may not be linear and may vary during the course of the rundown. The controller 24 may measure the rundown time as the length of time from the shutdown sequence initiation 92 to the second predetermined rotation speed 94.

Step 612 includes identifying a cause of insufficient starter acceleration. The cause of the insufficient starter acceleration is identified by comparing the measured rundown time (see Step 610 to the rundown time threshold (e.g., the rundown time threshold 88 of FIGS. 7A and 7B; see Step 608). If the measured rundown time is less than the rundown time threshold, operation and/or performance of the starter 52 may be ruled out as a substantial contributor to the insufficient starter acceleration. Accordingly, the cause of the insufficient starter acceleration may be identified as excessive drag for the first rotational assembly 40. For example, the rundown rotation speed profile 90 of FIG. 7A reaches the second predetermined rotation speed 94 prior to the rundown time threshold 88, thereby indicating excessive drag for the first rotational assembly 40. Excessive drag from the first rotational assembly 40 may be caused by factors such as, but not limited to, bladed compressor rotor (e.g., the bladed compressor rotor 48 or the bladed first turbine rotor 50) rubbing, worn gears or mechanical clash in one or more gearbox assemblies coupled with the first rotational assembly 40, and/or insufficient lubrication of first rotational assembly 40 components or associated bearing support systems. If the measured rundown time is greater than or equal to the rundown time threshold, drag for the first rotational assembly 40 may be ruled out as a substantial contributor to the insufficient starter acceleration. Accordingly, the cause of the insufficient starter acceleration may be identified as insufficient starter (e.g., the starter 52) torque for the first rotational assembly 40 during an engine start sequence. For example, the rundown rotation speed profile 90 of FIG. 7B reaches the second predetermined rotation speed 94 subsequent to the rundown time threshold 88, thereby indicating insufficient starter torque. Insufficient starter torque may be caused by factors such as, but not limited to, reduced availability of electrical or pneumatic power (e.g., a weak battery or low pneumatic air pressure) for the starter 52, a weak, defective, or otherwise degraded starter 52, improper electrical connections, or pneumatic air supply leakage.

Step 614 may include execution of one or more corrective actions in response to identifying the cause of the insufficient starter acceleration. For example, Step 614 may include generating a warning (e.g., an audible alarm, a warning light, a warning message, etc.) for a pilot or other operator of the aircraft on which the propulsion system 20 is installed. The warning may inform the pilot or other operator of the cause of the insufficient starter acceleration. The warning may inform the pilot or other operation that maintenance (e.g., starter 52 replacement) should be performed for the engine 22, the first rotational assembly 40, and/or the starter 52.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged.

A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An assembly for an aircraft engine, the assembly comprising:

a rotational assembly including at least one rotor;

a starter coupled with the rotational assembly, and the starter is configured to selectively drive rotation of the rotational assembly; and a controller including a processor in communication with a non-transitory memory storing instructions, which instructions when executed by the processor, cause the processor to:

determine an acceleration threshold for a starter-assist only phase of an engine start sequence for the aircraft engine using a measured engine oil temperature for the aircraft engine;

measure an acceleration of the rotational assembly during the starter-assist only phase; and identify a presence or an absence of insufficient starter acceleration for the starter-assist only phase by comparing the measured acceleration to the acceleration threshold, the presence of the insufficient starter acceleration is identified when the measured acceleration is less than the acceleration threshold, and the absence of the insufficient starter acceleration is identified when the measured acceleration is greater than the acceleration threshold;

the measured acceleration is an area under an acceleration curve for the starter-assist only phase, and the acceleration curve represents a starter-assist only acceleration of the rotational assembly and a starter-assist only rotation speed of the rotational assembly between a low-speed boundary and a high-speed boundary within the starter-assist only phase; and wherein the instructions, when executed by the processor, further cause the processor to generate a warning in response to identifying the presence of the insufficient starter acceleration.

2. The assembly of claim 1, wherein the instructions, when executed by the processor, further cause the processor to identify the measured engine oil temperature at an initiation of the engine start sequence.

3. The assembly of claim 1, wherein the instructions, when executed by the processor, further cause the processor to measure the acceleration of the rotational assembly at a predetermined rotation speed of the rotational assembly during the starter-assist only phase.

4. The assembly of claim 1, wherein the engine start sequence is a restart sequence for the aircraft engine during a flight condition.

5. The assembly of claim 4, wherein the instructions, when executed by the processor, further cause the processor to determine the acceleration threshold for the starter-assist only phase using the measured engine oil temperature and an airspeed for the aircraft engine.

6. The assembly of claim 1, wherein the instructions, when executed by the processor, further cause the processor to identify a cause of the insufficient starter acceleration during a shutdown sequence for the aircraft engine, and the shutdown sequence is subsequent to the engine start sequence.

7. The assembly of claim 6, wherein the instructions, when executed by the processor, further cause the processor to identify the cause of the insufficient starter acceleration by comparing a rundown time for the rotational assembly during the shutdown sequence to a rundown time threshold.

8. The assembly of claim 7, wherein the instructions, when executed by the processor, further cause the processor to determine the rundown time threshold using an air inlet temperature, an altitude, and the measured engine oil temperature.

9. The assembly of claim 7, wherein the instructions, when executed by the processor, further cause the processor to identify the cause of the insufficient starter acceleration as rotational assembly drag when the rundown time is less than the rundown time threshold or as the starter when the rundown time is greater than the rundown time threshold.

10. The assembly of claim 1, wherein the starter is an electric starter.

11. The assembly of claim 1, wherein the starter is a pneumatic starter.

12. A method for identifying insufficient starter acceleration for an engine start sequence for an aircraft engine, the method comprising:
 initiating the engine start sequence for the aircraft engine, and the engine start sequence includes applying a rotational force to a rotational assembly of the aircraft engine with a starter;
 measuring an engine oil temperature for the aircraft engine;
 determining an acceleration threshold for a starter-assist only phase of the engine start sequence using the measured engine oil temperature;
 measuring an acceleration of the rotational assembly during the starter-assist only phase;
 identifying a presence or an absence of insufficient starter acceleration for the starter-assist only phase by comparing the measured acceleration to the acceleration threshold, the presence of the insufficient starter acceleration is identified when the measured acceleration is less than the acceleration threshold, and the absence of the insufficient starter acceleration is identified when the measured acceleration is greater than the acceleration threshold; and
 identifying a cause of the insufficient starter acceleration, during a shutdown sequence for the aircraft engine subsequent to the engine start sequence, by comparing a rundown time for the rotational assembly during the shutdown sequence to a rundown time threshold, the rundown time threshold determined using an air inlet temperature, an altitude, and a measured engine oil temperature, the cause of the insufficient starter acceleration identified as rotational assembly drag when the rundown time is less than the rundown time threshold or as the starter when the rundown time is greater than the rundown time threshold.

13. The method of claim 12, wherein measuring the acceleration includes measuring the acceleration at a predetermined rotation speed of the rotational assembly during the starter-assist only phase.

14. The method of claim 12, wherein the measured acceleration is an area under an acceleration curve for the starter-assist only phase, and the acceleration curve represents a starter-assist only acceleration of the rotational assembly and a starter-assist only rotation speed of the rotational assembly between a low-speed boundary and a high-speed boundary within the starter-assist only phase.

15. An assembly for an aircraft engine, the assembly comprising:
 a rotational assembly including at least one rotor;
 a starter configured to selectively drive rotation of the rotational assembly; and
 a controller including a processor in communication with a non-transitory memory storing instructions, which instructions when executed by the processor, cause the processor to:
  determine an acceleration threshold for a starter-assist only phase of an engine start sequence for the aircraft engine;
  measure an acceleration of the rotational assembly during the starter-assist only phase;
  identify a presence of insufficient starter acceleration for the starter-assist only phase by comparing the measured acceleration to the acceleration threshold; and
  identify a cause of the insufficient starter acceleration, in response to identification of the presence of the insufficient starter acceleration, during a shutdown sequence for the aircraft engine, by comparing a rundown time for the rotational assembly during the shutdown sequence to a rundown time threshold;
 wherein the instructions, when executed by the processor, further cause the processor to:
  determine the rundown time threshold using an air inlet temperature, an altitude, and a measured engine oil temperature; and
  identify the cause of the insufficient starter acceleration as rotational assembly drag when the rundown time is less than the rundown time threshold or as the starter when the rundown time is greater than the rundown time threshold.

16. The assembly of claim 15, wherein the measured acceleration is an area under an acceleration curve for the starter-assist only phase, and the acceleration curve represents a starter-assist only acceleration of the rotational assembly and a starter-assist only rotation speed of the rotational assembly between a low-speed boundary and a high-speed boundary within the starter-assist only phase.

\* \* \* \* \*